United States Patent [19]

Long et al.

[11] Patent Number: 5,060,760
[45] Date of Patent: Oct. 29, 1991

[54] DEVICE FOR FEEDING GREASE TO A PLURALITY OF BEARINGS

[75] Inventors: Jacques Long, Annecy; Denis Perrillat-Amédé, Annecy Le Vieux, both of France

[73] Assignee: Alcatel Cit, Paris, France

[21] Appl. No.: 525,811

[22] Filed: May 18, 1990

[30] Foreign Application Priority Data

May 22, 1989 [FR] France .................. 89 06637

[51] Int. Cl.$^5$ ............................................. F01M 1/18
[52] U.S. Cl. .................................. 184/6.4; 184/7.4; 384/448
[58] Field of Search ............... 184/7.4, 6.4, 6.1, 108, 184/39.1; 384/399, 448, 467, 471, 472, 476; 417/417, 498, 505, 63; 364/172

[56] References Cited

U.S. PATENT DOCUMENTS

| | | | |
|---|---|---|---|
| 2,521,615 | 9/1950 | Walker | 184/7.4 |
| 3,674,112 | 7/1972 | Roberts | 184/6.1 |
| 4,011,927 | 3/1977 | Smith | 184/26 |
| 4,252,505 | 2/1981 | Toyoda | 417/505 |
| 4,364,452 | 12/1982 | Crago | 184/7.4 |
| 4,738,336 | 4/1988 | Smith et al. | 184/6.4 |

FOREIGN PATENT DOCUMENTS

| | | | |
|---|---|---|---|
| 0029736 | 6/1981 | European Pat. Off. | |
| 0078420 | 5/1983 | European Pat. Off. | |
| 2229990 | 1/1974 | Fed. Rep. of Germany | 184/6.4 |
| 0013221 | 1/1983 | Japan | 384/448 |
| 626972 | 12/1981 | Switzerland | |
| 0241841 | 4/1969 | U.S.S.R. | 384/471 |

*Primary Examiner*—Ira S. Lazarus
*Assistant Examiner*—Alan B. Cariaso
*Attorney, Agent, or Firm*—Sughrue, Mion, Zinn, Macpeak & Seas

[57] ABSTRACT

A device for feeding grease to the bearings of a rotary machine comprising a stator and a rotor, the device comprising injectors for injecting grease into said bearings, the injectors being controlled by an electronic control circuit which has inputs receiving signals from sensors for sensing parameters characteristic of the operating state of the bearings. The injectors are connected to a supply of grease under pressure and comprise injector blocks each connected to a respective bearing feeder channel. The sensors are pressure and temperature sensors, and the electronic circuit includes a clock and generates injection cycles as a function of a preestablished program, taking account of the information provided by the sensors and by the operating time of the bearings.

4 Claims, 5 Drawing Sheets

DEVICE FOR FEEDING GREASE TO A PLURALITY OF BEARINGS

The present invention relates to a device for feeding grease to a plurality of bearings.

BACKGROUND OF THE INVENTION

The invention is applicable to any case where it is desired to grease bearings automatically independently of one another and during machine rotation. This applies when operating conditions for the bearings in a machine differ depending on bearing location, one bearing being nearer to a source of heat dissipation than another, for example.

Thus, the invention applies in particular to automatically and independently greasing the bearings of a turbomolecular vacuum pump.

U.S. Pat. No. 4,738,336 describes a system for automatically feeding ball bearings with oil. It includes a photovoltaic sensor for determining the ratio between the speed of rotation of the ball bearing cage relative to the speed of rotation of the shaft. As a function of this information, a control system 54 generates an injection cycle and controls a pump.

However, this system is not suitable for feeding bearings with grease as a function of their real requirements.

The invention provides a device for feeding bearings with grease as a function of their real requirements and in a manner which is accurately calibrated.

SUMMARY OF THE INVENTION

The present invention provides a device for feeding grease to the bearings of a rotary machine comprising a stator and a rotor, the device comprising means for injecting grease into said bearings, said means being controlled by an electronic control circuit which has inputs receiving signals from sensors for sensing parameters characteristic of the operating state of the bearings, wherein said means comprise a supply of grease under pressure connected to injector blocks each connected to a respective bearing feeder channel, said sensors being pressure and temperature sensors, and said electronic circuit including a clock and generating injection cycles as a function of a preestablished program and taking account of the information provided by the said sensors and by the operating time of the bearings.

One of said injector blocks may include an inlet orifice connected to said grease supply and an outlet connected to a bearing feeder channel, the inlet orifice and the outlet orifice being interconnected by internal channels, said block being provided with a two-position valve, having a first position in which it leaves said inlet open while closing said outlet, and a second position in which it closes said inlet while leaving said outlet open, and an injector piston displaceable between a first position in which the piston is disengaged so as not to obstruct any of said internal channels between the inlet orifice and the outlet orifice, and a second position in which said piston penetrates into at least a portion of said channels.

Advantageously, said valve and said injector piston are each actuated by a polarized electromagnet controlled by said electronic circuits.

Each feeder channel leads to a threaded cylindrical rotor portion immediately adjacent to a corresponding one of the bearings.

BRIEF DESCRIPTION OF THE DRAWINGS

An embodiment of the invention is described by way of example with reference to the accompanying drawings, in which.

DETAILED DESCRIPTION

Figure 1:
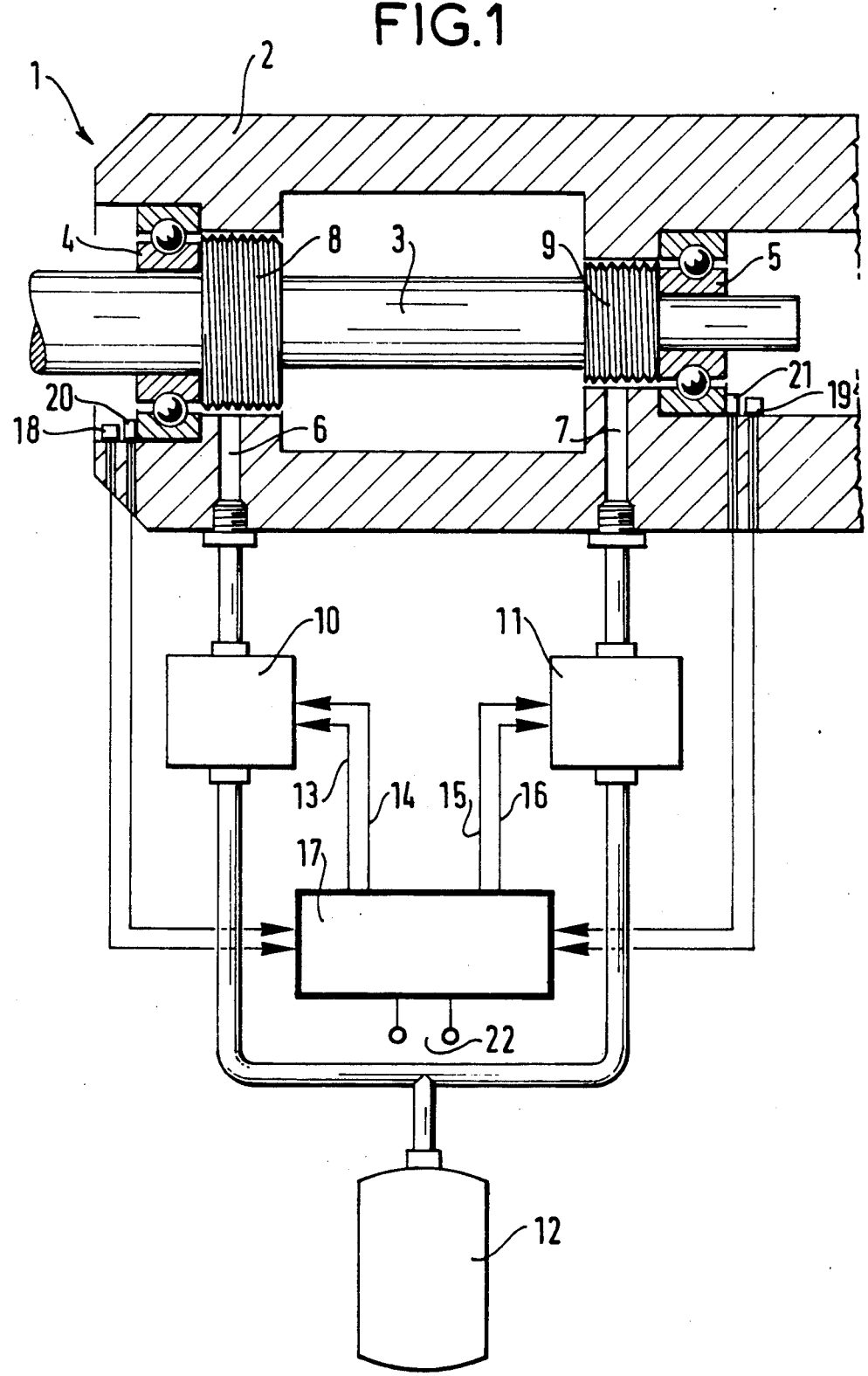
FIG. 1 is an overall diagrammatic view of the invention.

With reference to FIG. 1, there can be seen a fragment of a rotary machine 1 which may, for example, be a vacuum pump that rotates at high speed, e.g. a turbomolecular or other type of pump comprising a stator 2 and a rotor (not shown) fixed to a shaft 3 supported in the stator 2 by two ball bearings 4 and 5.

For each bearing, the stator is pierced by a grease feeder channel referenced 6 for the bearing 4 and 7 for the bearing 5.

The feeder channels 6 and 7 lead to respective threaded cylindrical bearing surfaces 8 and 9 on the rotary shaft 3. These surfaces are immediately adjacent to the bearings 4 and 5. Thus, during rotation of the rotor and the shaft 3, grease injected along the feeder channels 6 and 7 is conveyed axially towards the ball bearing 4 and 5 by the threaded surfaces 8 and 9 which thus act like screw pumps, each distributing grease over a circular ring and thus obtaining uniform greasing of the bearings around their entire perimeter.

Each grease feeder channel 6 (7) is connected to an injector block 10 (11) for injecting a calibrated volume of grease into the feeder channel. A particular example of an injector block 10 (11) is described with reference to FIGS. 2 to 5.

A supply 12 of grease under pressure is connected to the injector blocks 10 and 11. The supply 12 is also described with reference to FIGS. 2 to 5.

The injector blocks 10 and 11 are controlled by control signals applied on outputs 13 to 16 of an electronic circuit 17 which generates injection cycles for each bearing. Pressure sensors 18 and 19 and temperature sensors 20 and 21 situated in the vicinity of the bearings 4 and 5 are connected to the electronic circuit 17. On the basis of data supplied by the sensors and on the basis of the operating time of each bearing, the electronic circuit 17 (which includes a clock) generates injection cycles for each bearing as a function of a preestablished program and it delivers corresponding control instructions on the outputs 13 to 16. As a result, the bearings are greased independently from each other while the machine is rotating and as a function of the requirements of the individual bearings as determined by their operating conditions of temperature and pressure and by the time they have been in operation.

The electronic circuit 17 is fed with external power at 22.

A particular example of the supply 12 and of an injector block 10 is described below with reference to FIGS. 2 to 5, it being understood that the two injector blocks 10 and 11 are identical.

The supply 12 is a single volume filled under a vacuum with grease 23 and put under pressure by a piston 24 thrust by a spring 25. The supply is pierced by an orifice which is closed by a plug 26, thereby enabling the supply to be filled with grease. The volume of the supply is adapted to the desired number of lubrication operations.

The supply 12 is connected via a rigid or flexible vacuumtight duct 27 to each of the injector blocks 10 and 11. Only one of the injector blocks is shown in the figures.

Each injector block includes an inlet orifice 28 connected to the supply 12 and an outlet orifice 29 connected to the feeder cannel 6 of the bearing 4.

These inlet and outlet orifices 28 and 29 are interconnected by internal channels 30, 31, and 32.

The channels 30 and 31 are parallel.

Figure 2:
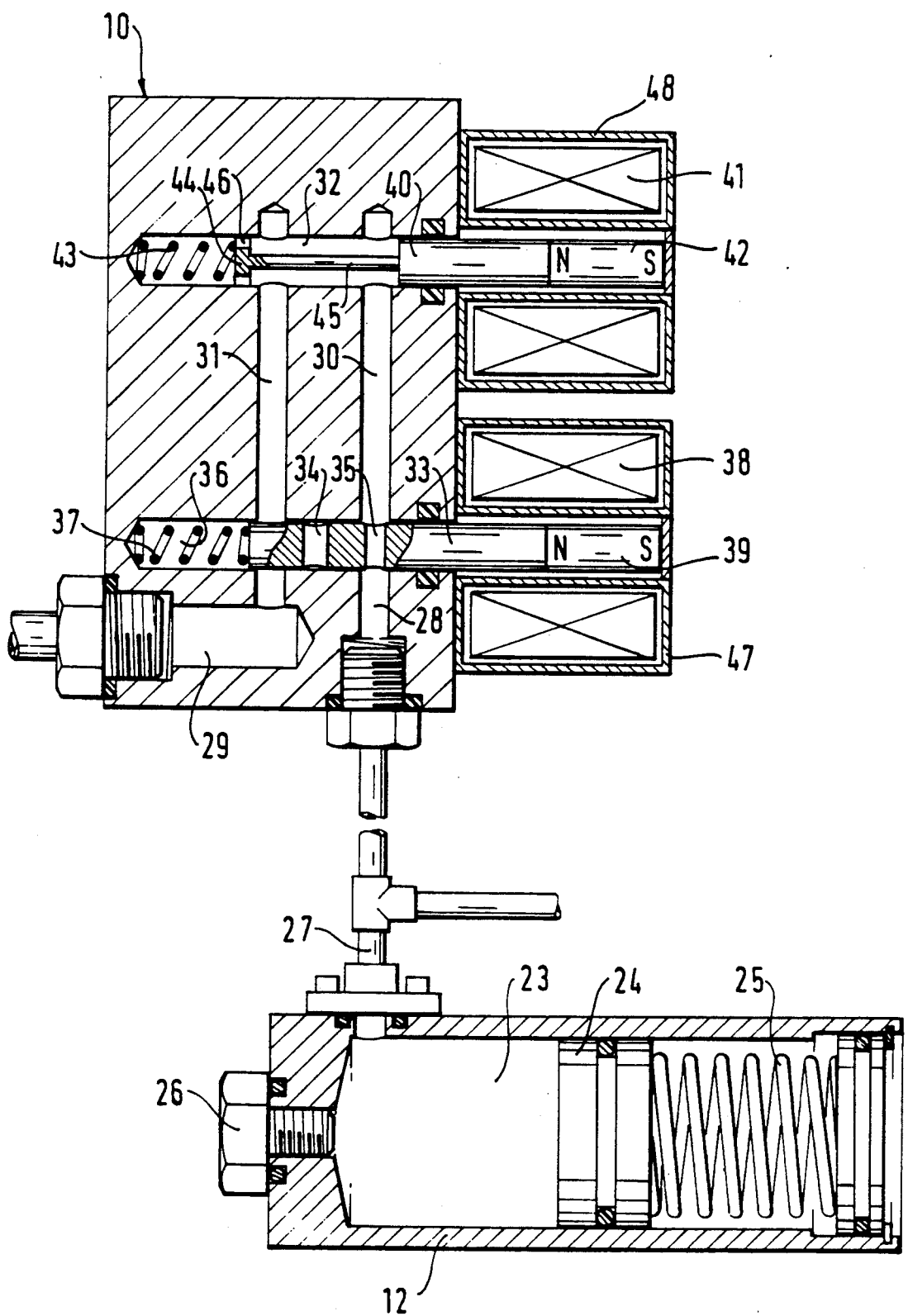
FIGS. 2 and 5 show four consecutive states of a particular injection block connected to a supply of grease under pressure.

The channel 30 continues the inlet orifice 28 and the channel 31 leads to the outlet orifice 29. At their ends furthest from the inlet and outlet orifices 28 and 29, the channels 30 and 31 are interconnected by the channel 32 which constitutes a transverse channel. The injector block is provided with a valve 33. The valve 33 is cylindrical and has two passages 34 and 35, and it is received in a cylindrical hole 36 in the injector block and passing through the channels 30 and 31. The valve 33 may take up two positions in the hole 36. In a first position, as shown in FIG. 2, the passage 35 coincides with the channel 30 and the inlet orifice 28 is thus opened, while the outlet orifice 29 is closed, and in a second position (FIG. 3) the passage 34 coincides with the channel 31 and the outlet orifice 29 is therefore opened while the inlet orifice 28 is closed. A return spring 37 urges the valve 33 to the position shown in FIG. 2. The valve 33 is actuated in the opposite direction by an electromagnet comprising a winding 38 and a core 39 fixed to the valve 33. In order to obtain a larger force, the core 39 is a permanent magnet.

The injector block 10 is also provided with an injection piston 40 received in the transverse channel 32 which extends beyond the channels 30 and 31.

The injection piston is likewise controlled by an electromagnet comprising a winding 41 and a magnetic core 42. It is also provided with a return spring 43 which bears against a bearing surface 44 connected to the piston 40 by means of a rod 45, thereby avoiding the need for a spring which is excessively long. Naturally, the bearing surface 44 is pierced by holes 46 so as to enable the piston 40 to compress the grease and oblige it to descend along the channel 31.

Figure 3:
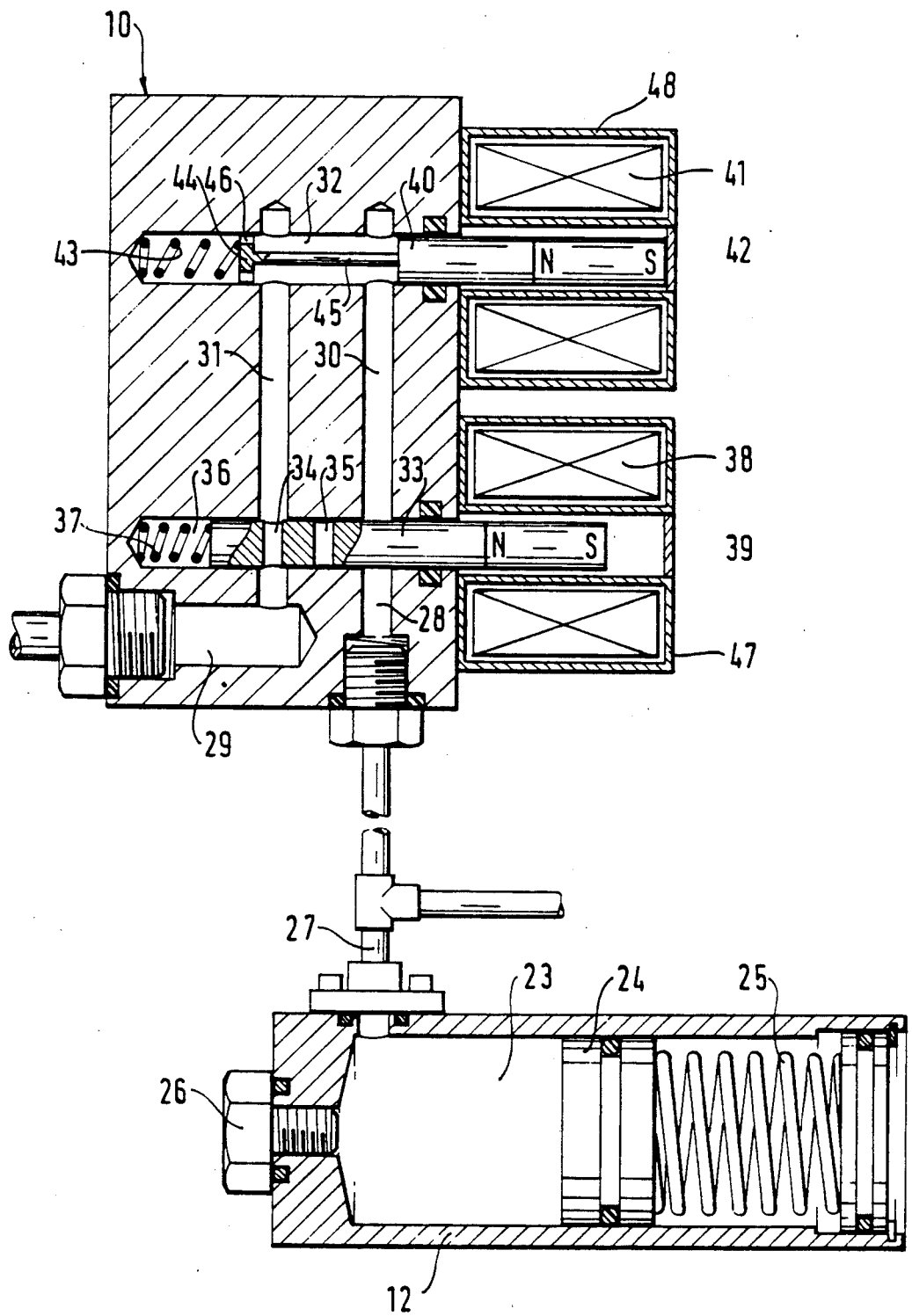
Figure 4:
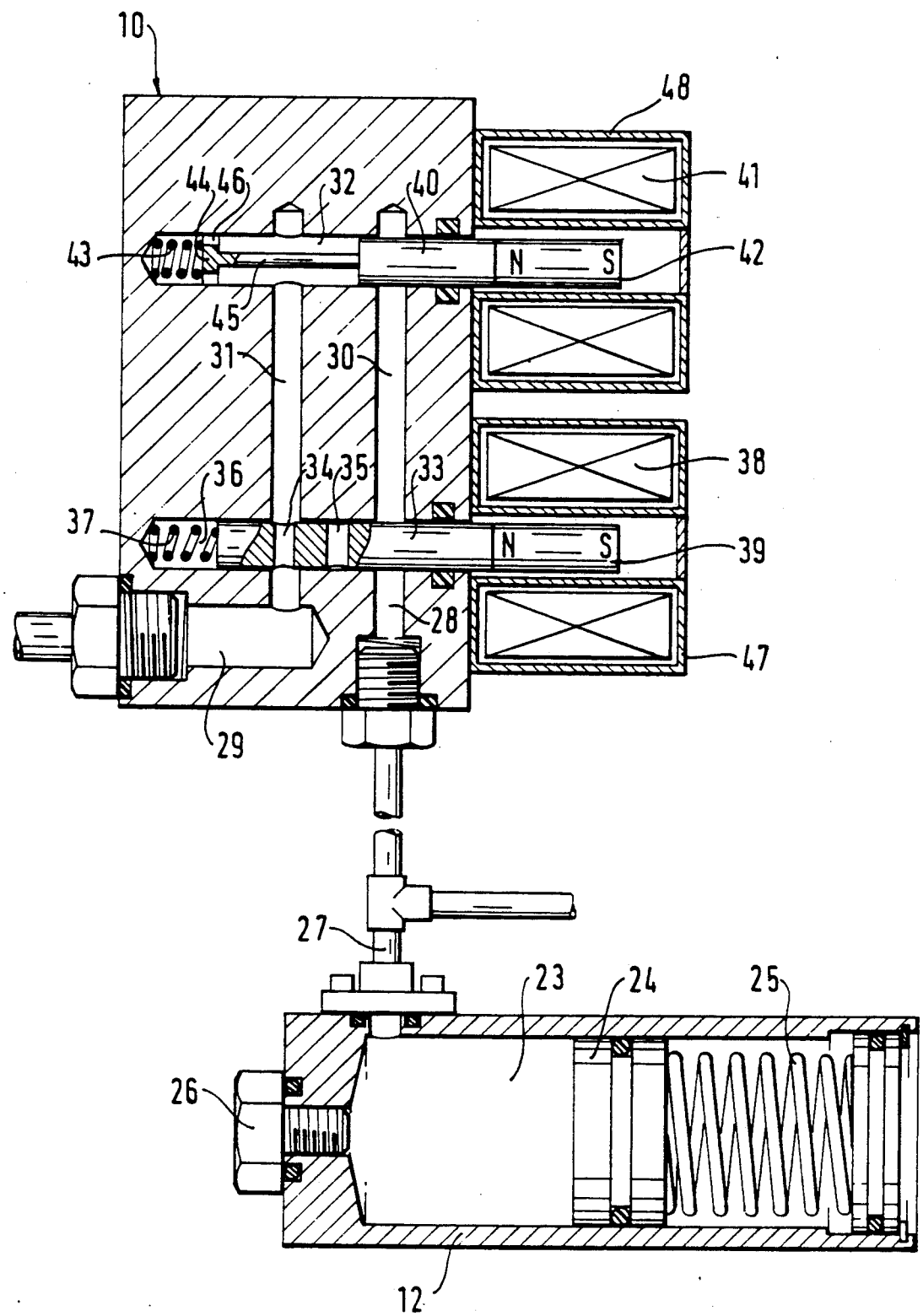
Figure 5:
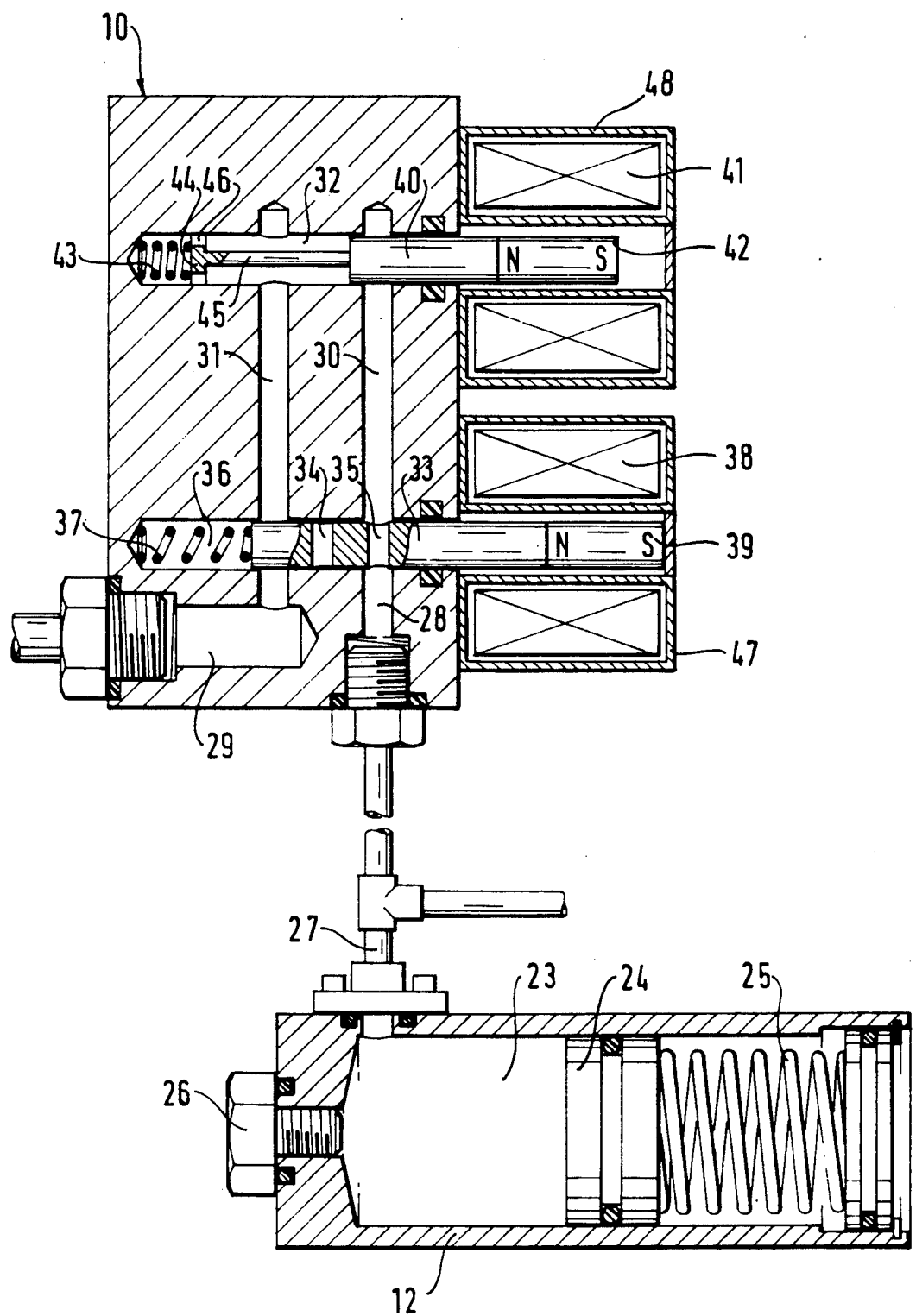

In a first position, as shown in FIGS. 2 and 3, the injector piston 40 is disengaged from the transverse channel 32 enabling grease to flow therealong, while in a second position as shown in FIGS. 4 and 5, the piston 40 penetrates into the transverse channel 32, thereby thrusting grease towards the channel 31.

In order to obtain better efficiency, the windings 38 and 41 include respective magnetic circuits 47 and 48.

The operating cycle is as follows:

In the position shown in FIG. 2, the inlet orifice 28 is open and the outlet orifice 29 is closed. The piston 40 is withdrawn from the transverse channel 32.

Grease under thrust from the piston 24 and the spring 25 in the supply 12 completely fills the channels 30, 31, and 32.

In the position shown in FIG. 3, power is fed to the winding 38 in order to close the inlet orifice 28 and open the outlet orifice 29.

In the position shown in FIG. 4, the injection stage is performed by powering the winding 41: the piston 40 penetrates into the transverse channel 32, thereby thrusting grease towards the channel 31 and thence towards the outlet 29 and along the feeder channel 6.

Finally, in the position shown in FIG. 5, the inlet 28 is reopened and the outlet 29 is closed by switching the power to the winding 38.

The system is then returned to the position shown in FIG. 2 by switching off the power to the winding 42, thereby enabling the return spring 43 to push the piston 40 out from the transverse channel 32.

Naturally, on starting up, it is necessary initially to fill all of the channels completely with grease right up to the feeder channel 6.

It should be observed that the outlet 29 must be closed before returning the piston 40 in order to prevent grease from being sucked backwards by the suction set up by the piston reversing.

When too high a head loss occurs due to movement of the grease (high grease viscosity due to low ambient temperature) the supply 12 and the injector block 10 are provided with electrical heater means.

In addition, other embodiments of the valve 33 and of the piston 40 may designed, and they may be controlled differently, e.g. pneumatically.

We claim:

1. A device for feeding grease to the bearings of a rotary machine comprising a stqator and a rotor, said device comprising: means for injecting grease into said bearings, an electronic control circuit connected to said injecting means, said circuit including inputs receiving signals from sensors adjacent said bearings for sensing parameters characteristic of the operating state of the bearings, said injecting means comprising a supply of grease under pressure connected to a plurality of injector blocks, each injector block being connected to a respective bearing feeder channel, said sensors being pressure and temperature sensors, and said electronic circuit including a clock and means for generating injecting cycles as a function of a pre-established program based on information provided by said sensors through said inputs and the operating time of the bearings.

2. A device according to claim 1, wherein at least one of said injector blocks includes an inlet orifice connected to said grease supply and an outlet connected to a bearing feeder channel, the inlet orifice and the outlet orifice being interconnected by internal channels, said block being provided with a two-position valve, having a first position in which it leaves said inlet open while closing said outlet, and a second position in which it closes said inlet while leaving said outlet open, and an injector piston displaceable between a first position in which the piston is disengaged so as not to obstruct any of said internal channels between the inlet orifice and the outlet orifice, and a second position in which said piston penetrates into at least a portion of said channels.

3. A device according to claim 2, wherein said valve and said injector piston are each actuated by a polarized electromagnet controlled by said electronic circuits.

4. A device according to claim 1, wherein each feeder cannel leads to a threaded cylindrical rotor portion immediately adjacent to a corresponding one of the bearings.

* * * * *